US011172790B2

(12) United States Patent
Warren

(10) Patent No.: US 11,172,790 B2
(45) Date of Patent: Nov. 16, 2021

(54) PORTABLE BODY WASTE COLLECTION AND SANITATION SYSTEM

(71) Applicant: Alaska Native Tribal Health Consortium, Anchorage, AK (US)

(72) Inventor: John Warren, Anchorage, AK (US)

(73) Assignee: Alaska Native Tribal Health Consortium, Anchorage, AK (US)

( * ) Notice: Subject to any disclaimer, the term of this patent is extended or adjusted under 35 U.S.C. 154(b) by 104 days.

(21) Appl. No.: 16/508,148

(22) Filed: Jul. 10, 2019

(65) Prior Publication Data

US 2020/0015636 A1     Jan. 16, 2020

Related U.S. Application Data

(60) Provisional application No. 62/696,763, filed on Jul. 11, 2018.

(51) Int. Cl.
| | |
|---|---|
| *E04H 1/12* | (2006.01) |
| *A47K 4/00* | (2006.01) |
| *E03D 11/02* | (2006.01) |
| *A47K 11/12* | (2006.01) |
| *C02F 1/00* | (2006.01) |

(52) U.S. Cl.
CPC .............. *A47K 4/00* (2013.01); *A47K 11/12* (2013.01); *C02F 1/001* (2013.01); *E03D 11/02* (2013.01)

(58) Field of Classification Search
CPC .......... A47K 4/00; A47K 11/12; A47K 11/02; E04H 1/1216; E03D 7/00; E03D 11/02; E03D 5/016; E03D 5/00; E03D 5/003; E03D 5/006; E03D 5/01; E03D 5/014; B60R 15/00; C02F 1/001

USPC ... 4/664, 321, 341, 317, 462, 476, 449, 320, 4/323
See application file for complete search history.

(56) References Cited

U.S. PATENT DOCUMENTS

| | | | | |
|---|---|---|---|---|
| 187,991 | A | * | 3/1877 | Thompson .............. A47K 11/02 4/467 |
| 345,053 | A | * | 7/1886 | Heap ...................... A01N 47/22 4/464 |
| 3,579,655 | A | | 5/1971 | Sundberg |
| 3,601,821 | A | | 8/1971 | Corsiglia |

(Continued)

FOREIGN PATENT DOCUMENTS

| | | |
|---|---|---|
| CN | 2778171 Y | 5/2006 |
| CN | 201510224 U | 6/2010 |

(Continued)

OTHER PUBLICATIONS

International Search Report and Written Opinion for Application No. PCT/US2020/035395, dated Sep. 3, 2020, 11 pages.

(Continued)

*Primary Examiner* — Charles P. Cheyney
(74) *Attorney, Agent, or Firm* — Stoel Rives LLP

(57) ABSTRACT

The disclosure relates to a portable waste collection and sanitation system designed to handle liquid and solid waste, and while conserving water and minimizing odors. The sanitation system is also designed with modular components adapted for in-home installation, where the system can be quickly disassembled and relocated as needed, such as for moving the components to a new location based on environmental conditions.

19 Claims, 5 Drawing Sheets

(56) References Cited

U.S. PATENT DOCUMENTS

| | | | |
|---|---|---|---|
| 3,629,874 A * | 12/1971 | Beller | A47K 11/02 |
| | | | 4/462 |
| 6,615,414 B2 * | 9/2003 | Miller | E03D 7/00 |
| | | | 4/321 |
| 7,135,116 B2 | 11/2006 | Haggerty | |
| 7,846,143 B1 | 12/2010 | Abbato | |
| 8,162,145 B1 * | 4/2012 | Merritt | E04H 15/58 |
| | | | 206/541 |
| 9,303,420 B2 * | 4/2016 | van der Linde | A47K 11/02 |
| 9,364,124 B2 * | 6/2016 | Morris | A47K 11/026 |
| 9,493,937 B2 * | 11/2016 | Derenoncourt | E03D 5/003 |
| 9,737,180 B2 * | 8/2017 | Banner | A47K 11/02 |
| 2010/0050330 A1 * | 3/2010 | Earlywine | E03D 3/10 |
| | | | 4/321 |
| 2017/0007082 A1 * | 1/2017 | Li | C05F 3/04 |

FOREIGN PATENT DOCUMENTS

| | | |
|---|---|---|
| DE | 3515906 A1 | 11/1985 |
| EP | 1020155 A2 | 7/2000 |
| RU | 40424 U1 | 9/2004 |
| RU | 2243916 C2 | 1/2005 |
| RU | 110390 U1 | 11/2011 |
| RU | 159122 U1 | 1/2016 |
| WO | 2004008930 A1 | 1/2004 |

OTHER PUBLICATIONS

International Search Report and Written Opinion for International Application No. PCT/US2019/041460, dated Oct. 17, 2019, 7 pages.

* cited by examiner

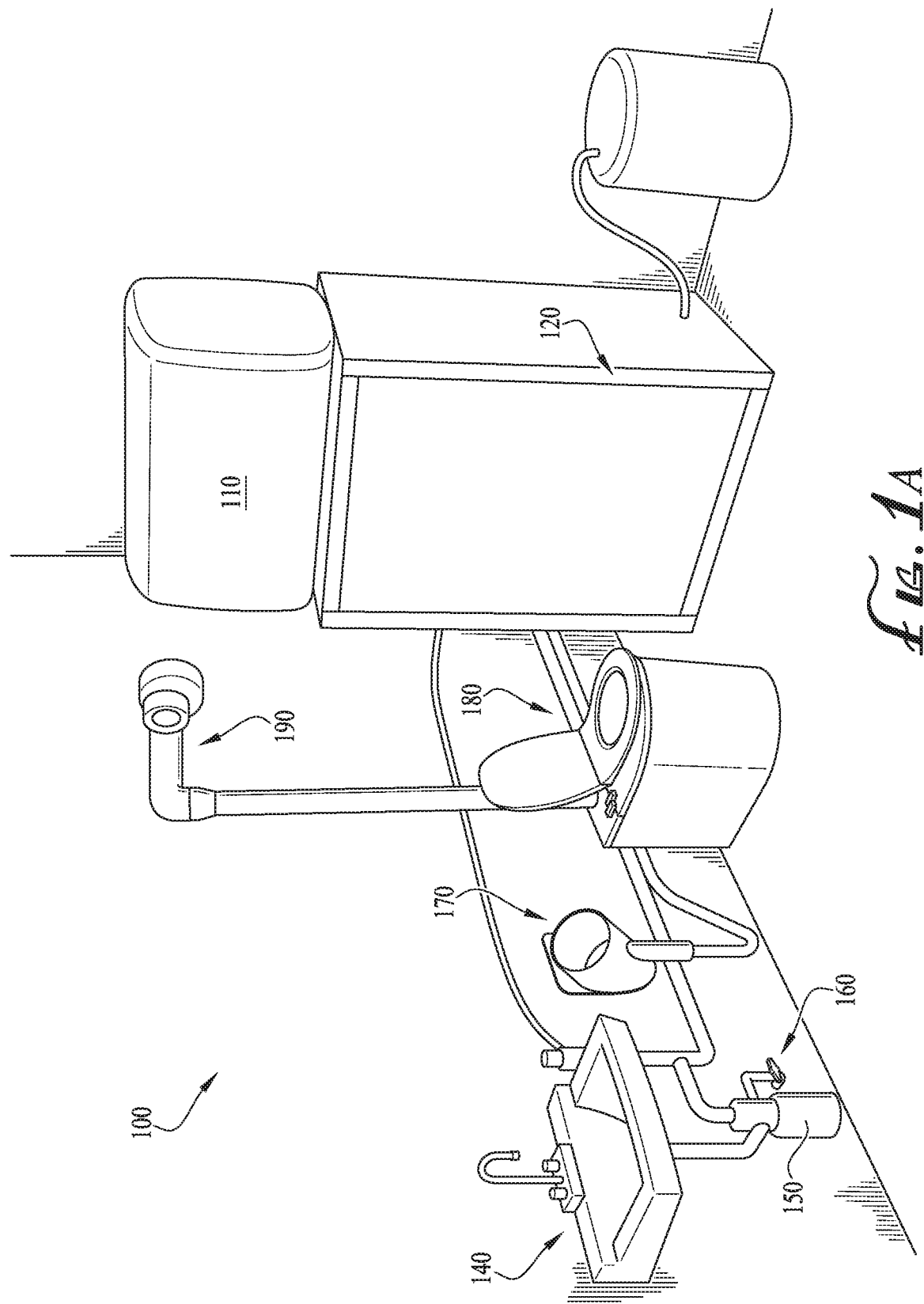

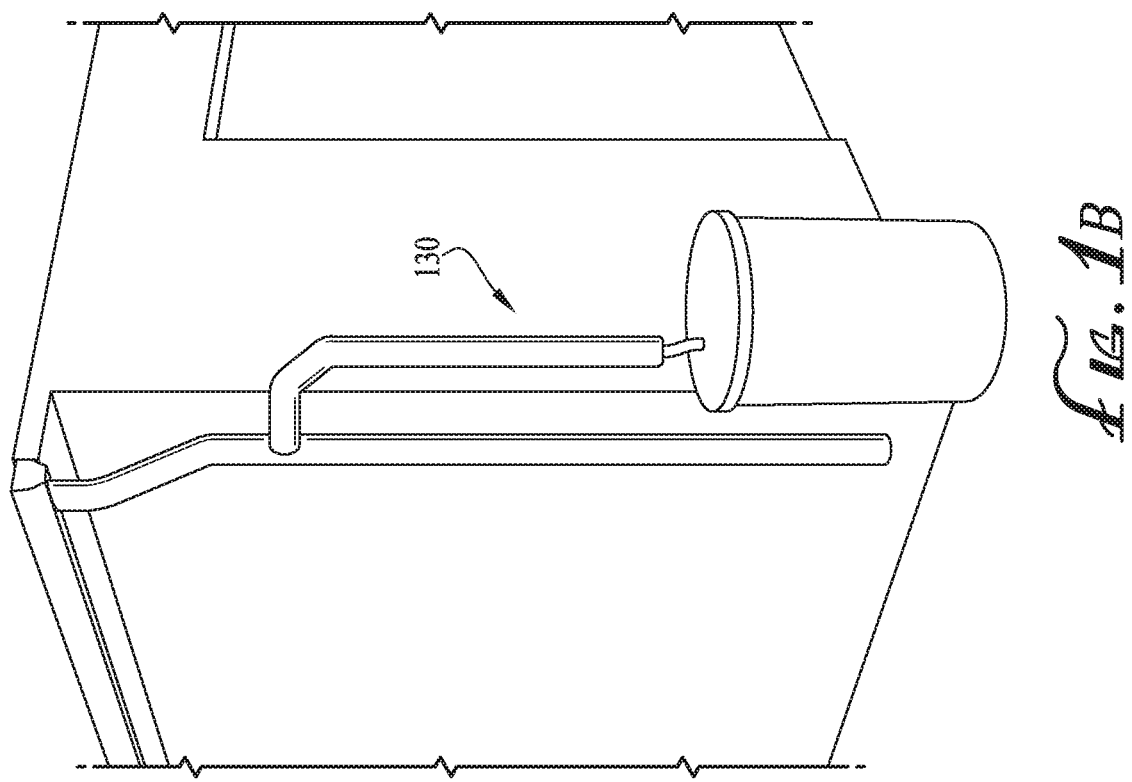

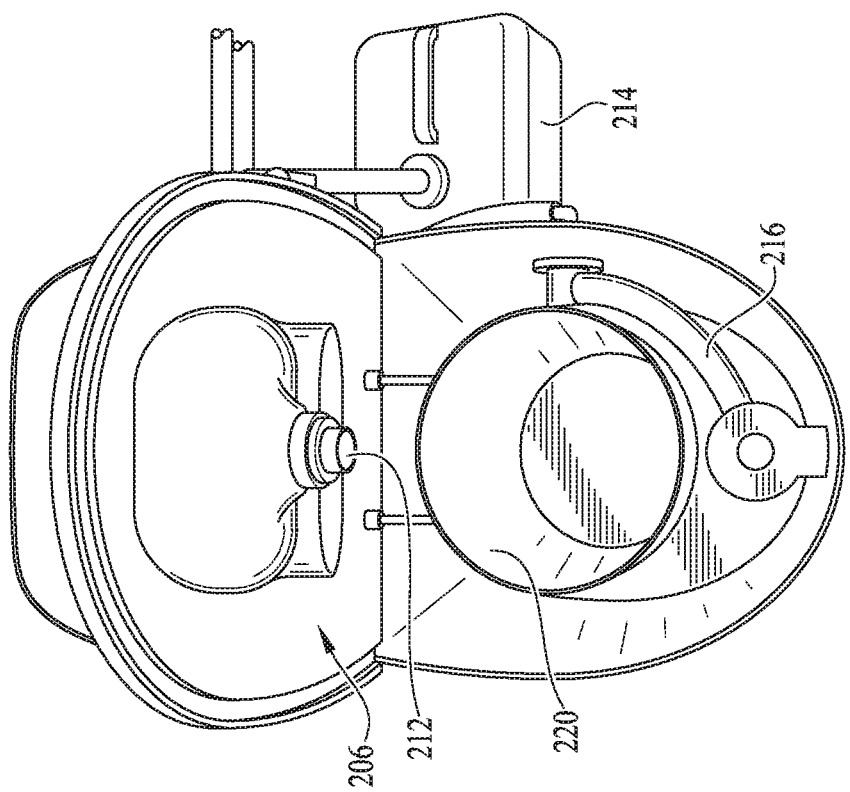
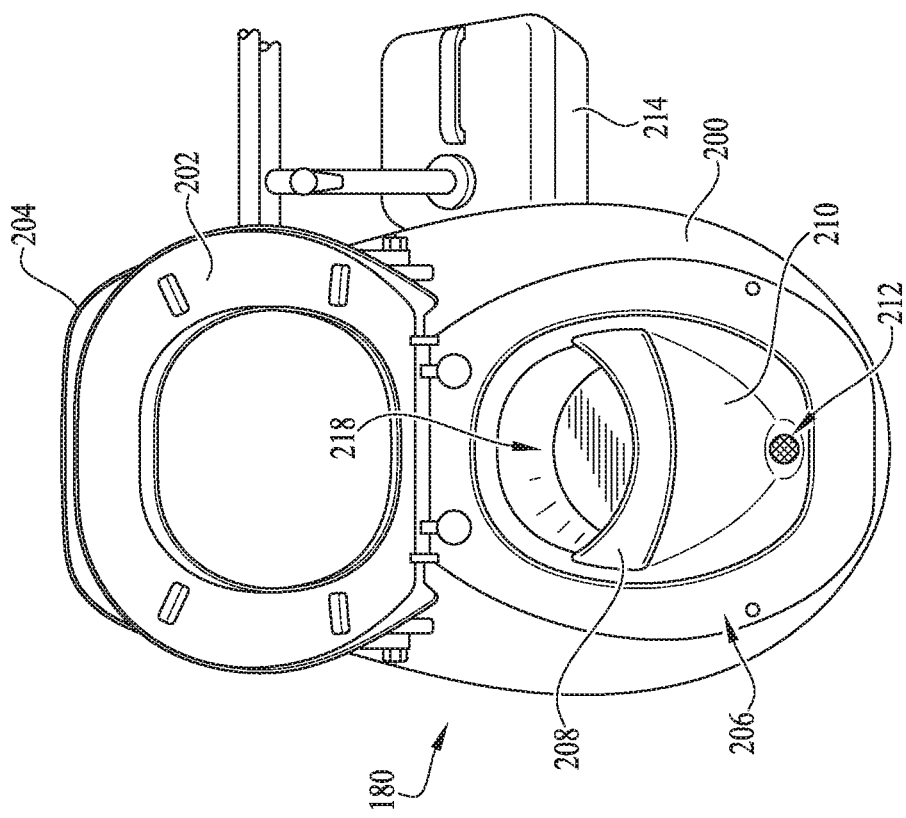

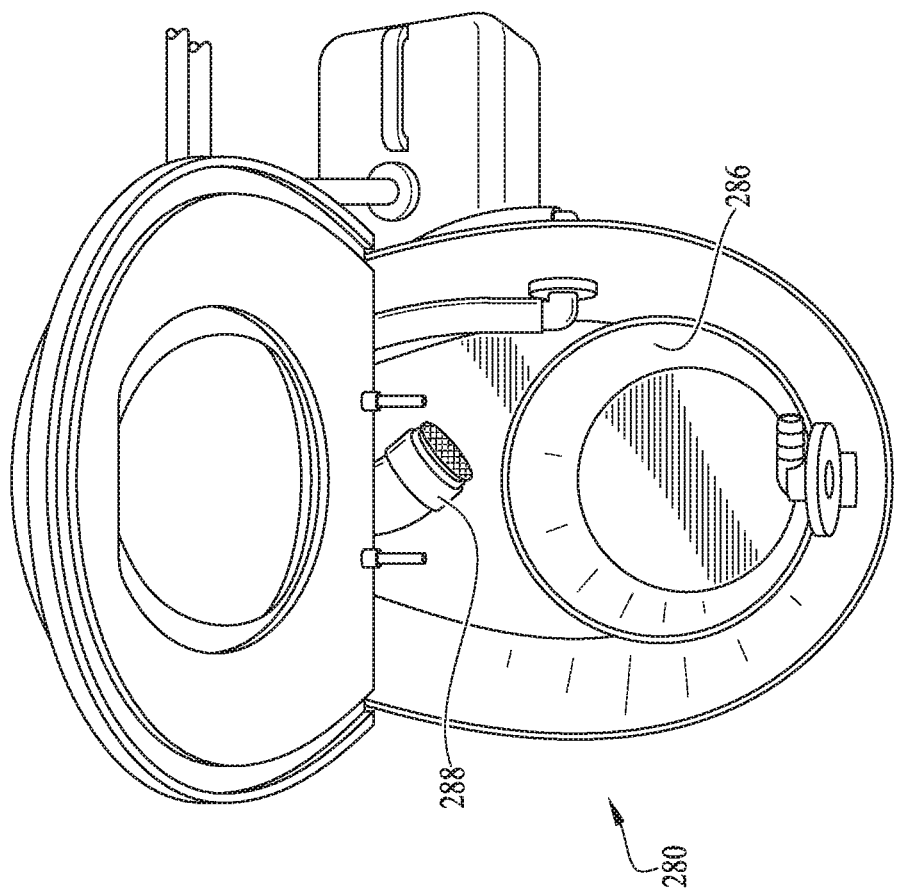
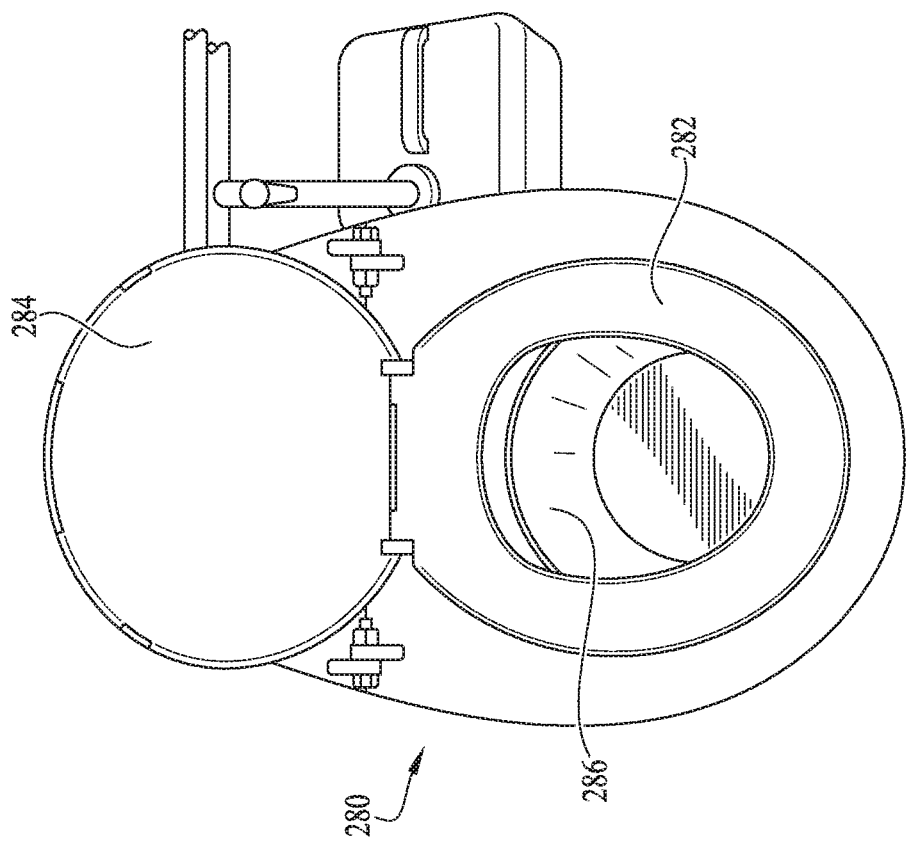

PORTABLE BODY WASTE COLLECTION AND SANITATION SYSTEM

RELATED APPLICATION DATA

This application is a nonprovisional of and claims the benefit under 35 U.S.C. § 119(e) of U.S. Provisional Patent Application No. 62/696,763, filed Jul. 11, 2018, the disclosure of which is incorporated by reference herein in its entirety.

TECHNICAL FIELD

The field of the present disclosure relates generally to body waste collection and improved sanitation systems, and in particular, to such systems designed for efficiently handling liquid and solid wastes while conserving water and minimizing odors. The described system is also designed to be portable with modular components adapted for in-home installation, where the system can be disassembled and moved with the home or dwelling to a new location as needed.

BACKGROUND

Many homes, especially those in developed nations, include at least one bathroom with a toilet for receiving and handling human waste and a sink with potable water for washing hands and maintaining appropriate hygiene. Such bathrooms tend to operate with plumbing and sewage systems that provide running water to facilitate flushing and removal of the human waste and to allow users to wash their hands with clean water. While plumbing systems are widely employed in many homes, such plumbing systems may not be available for all homes for various reasons. For example, in extremely cold climates, plumbing and sewage systems may be difficult to employ because of freezing issues. In coastal regions, erosion issues may impact such systems and require more portable solutions to accommodate people periodically moving further inland due to the eroding coastline. In impoverished regions, homes may not be permanent structures and water may be scarce, thereby making it impractical to install such complex plumbing systems.

Portable lavatory systems are generally known and used in many different settings in our modern society. For example, such systems are commonly used during outdoor social events, such as, sporting events and concerts, or during construction projects for the convenience of the construction workers. These portable lavatories are typically self-contained systems in a singular stall or structure with a holding tank located under the toilet or urinal for receiving and storing the waste. Typically, such systems do not have any flushing water and lack proper venting to handle odor from the waste that accumulates in the holding tank. While such systems may be useful for temporary events, they are generally unsanitary and not suitable for integrating into a home.

Accordingly, the present inventor has determined that it would be desirable to develop a portable body waste collection and sanitation system with improved features for efficiently handling and disposing of liquid and solid waste while conserving water use and minimizing odors. In addition, the present inventor has recognized a need for such an improved system specifically designed for in home use, where the system is configured in a modular arrangement with components that may be easily and quickly assembled and disassembled as needed, such as for servicing, repair, and/or relocation. Additional aspects and advantages will be apparent from the following detailed description of example embodiments, which proceeds with reference to the accompanying drawings. It should be understood that the drawings depict only certain example embodiments and are not to be considered as limiting in nature.

BRIEF DESCRIPTION OF THE DRAWINGS

FIGS. 1A and 1B collectively illustrate components and an example layout of a portable sanitation system in accordance with one embodiment.

FIGS. 2-3 illustrate details of an example embodiment of a separating toilet that may be used with the portable sanitation system of FIG. 1.

FIGS. 4-5 illustrate details of an example embodiment of another toilet system that may be used with the portable sanitation system of FIG. 1.

DETAILED DESCRIPTION OF EXAMPLE EMBODIMENTS

Figure 6:
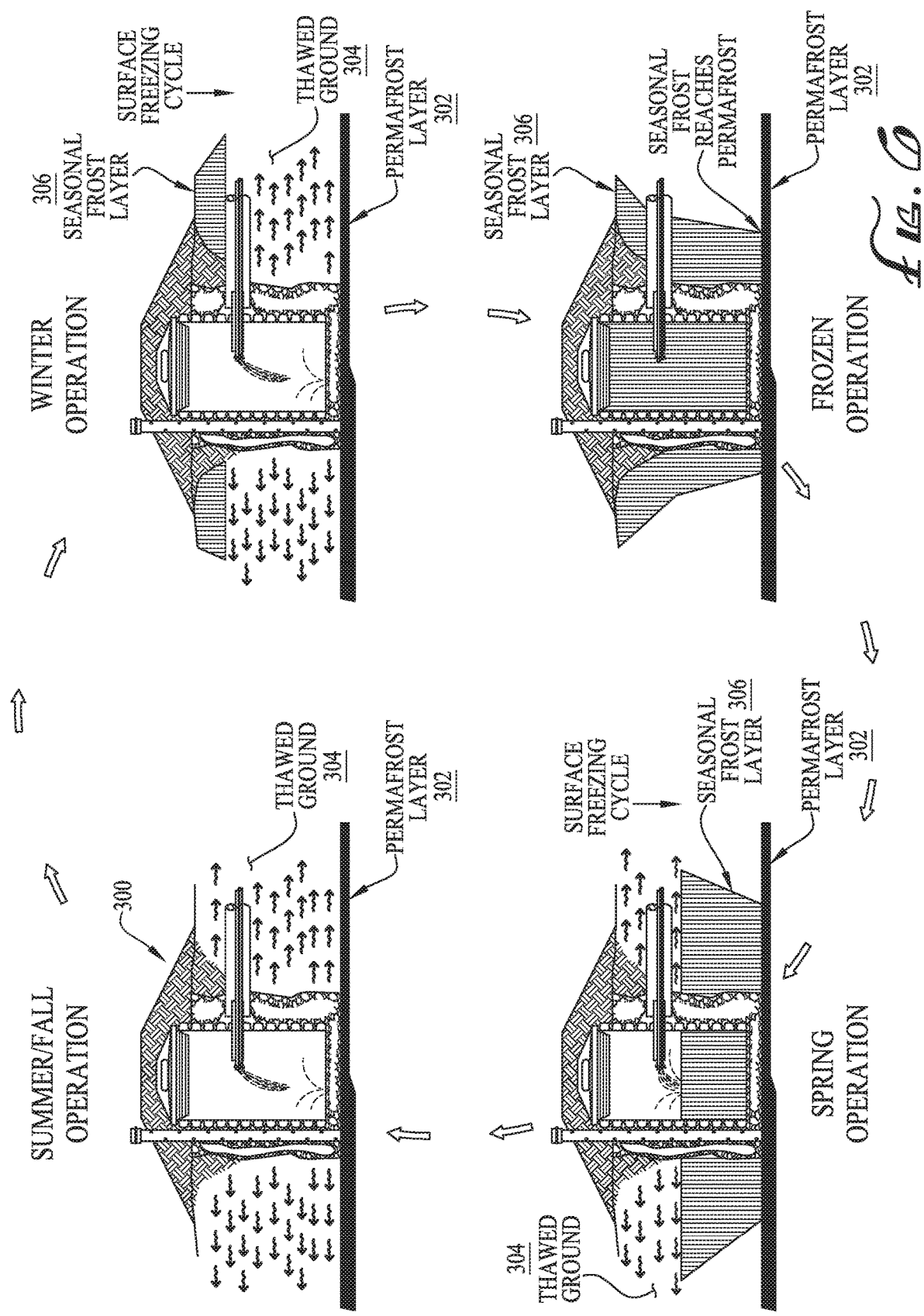
FIG. 6 is a schematic illustration of a seasonal seepage diagram for handling wastewater associated with the portable sanitation system of FIG. 1.

With reference to the drawings, this section describes particular embodiments and their detailed construction and operation. The embodiments described herein are set forth by way of illustration only and not limitation. Throughout the specification, reference to "one embodiment," "an embodiment," or "some embodiments" means that a particular described feature, structure, or characteristic may be included in at least one embodiment of the system or of the components being discussed. Thus appearances of the phrases "in one embodiment," "in an embodiment," or "in some embodiments" in various places throughout this specification are not necessarily all referring to the same embodiment. Further, the described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

With general reference to the figures, the following disclosure relates generally to an improved system and method for providing basic sanitation needs (e.g., handwashing, clean water, human waste disposal, etc.) to homes and other structures where piped water systems are nonexistent or impractical, such as in impoverished regions or lands that may be vulnerable to flooding and erosion. In some communities, problems with land erosion are so severe that homeowners and agencies are reluctant to invest in piping and sewage infrastructure due to the short useful shelf-life of such systems under these conditions, thereby creating health risks and problems that could be remedied or avoided altogether with the disclosed sanitation system further described below.

As illustrated in FIGS. 1-6, the sanitation system 100 includes a variety of modular components that are arranged to work together to provide clean water for homes, and to handle and dispose of human waste so as to minimize potential exposure to harmful pathogens. As described in further detail below, the sanitation system 100 is designed as a stand-alone model with components that may be easily assembled and disassembled to maximize portability of the system, thereby allowing the system to be dismantled and transported when homes are moved to new sites due to eroding coastlines, climate changes, or for other reasons. In addition, the sanitation system 100 provides privacy, safety, cleanliness, and a streamlined design that can be implemented at a relatively low cost. Accordingly, in addition to being a potential solution for areas with land erosion issues, the sanitation system 100 may be used in underdeveloped and impoverished regions, and/or may be used in other locations where access to basic sanitation facilities may be limited, such as camp grounds, deserts, and beaches. Additional details of these and other embodiments are further discussed below with particular reference to the accompanying figures.

FIG. 1A illustrates an example layout of a portable sanitation system 100 housed within an enclosure or building in accordance with one embodiment. With reference to FIG. 1A, the sanitation system 100 includes a water storage tank 110 for storing water that will be used with the system 100. Preferably, the water storage tank 110 is elevated above other water-consuming fixtures to provide water via a gravity flow to the fixtures without the need for a distribution pump. In other embodiments, the water storage tank 110 may incorporate a pump connected to an electric source for pumping water as needed. The water in the storage tank 110 may be disinfected and/or purified via any suitable method to ensure that the water is safe for use.

The system 100 further includes a water treatment system 120 that may be in communication with the storage tank 110 (or connected to a separate water tank) to provide filtration that is in compliance with federal and state drinking water requirements, thereby providing potable water that is safe for human consumption. The water treatment system 120 may include any of various suitable filtration devices operable to filter water, such as efficient cartridge filters and other similar devices. Preferably, the water treatment system 120 is designed such that it is easily movable so that it can be transported outdoors to provide filtered drinking water as needed. The water treatment system 120 may include a hand pump (not shown) that can be activated and used to allow the system to treat water without requiring electrical power. In other embodiments, the water treatment system 120 may instead include an electrical pump.

Water to the storage tank 110 (and/or to the tank with drinking water) may be provided in whole or in part by an exterior water catchment system 130. Generally speaking, water catchment is the process of collecting and storing rainwater, where the water may be reused for domestic tasks, or with sufficient filtration, may be reused as drinking water. With reference to FIG. 1B, the water catchment system 130 is located outside the home or bathroom structure, and arranged to collect and store water from rain gutters and/or other piping systems. The water catchment system 130 may deliver the captured water to the storage tank 110 via water treatment system 120. If the storage tank 110 is full, the water may be stored in a separate drum or barrel (not shown) that is in communication with the water catchment system 130. When water is needed from the drum or barrel, it may be delivered from the drum to the storage tank 110 via the electric pump and the water treatment system 120. In other embodiments, other suitable methods that may not require electrical power may be used to deliver water through water treatment system 120 and to the storage tank 110.

The system 100 includes a sink 140 connected to the water storage tank 110, the sink 140 being operable to dispense water from the storage tank 110 to provide clean, running water for handwashing, brushing teeth, and other sanitary or hygienic needs. Preferably, the sink 140 is a low-flow fixture that dispenses water more efficiently as compared to a traditional sink. For example, in some embodiments, the sink 140 may discharge water at a rate of 0.25 gallons per minute, or at a rate of up to 0.5 gallons per minute. A traditional sink typically operates with a flow rate between 1.5 to 2.5 gallons per minute. Preferably, the flow rate is optimized to conserve water while still providing a sufficient flow rate for desired use in the facility. In some embodiments, the sink 140 may further include a sink trap 150 located underneath the sink 140 to trap solids that may damage the seepage pit system 300 (see FIG. 6) if allowed to pass through unhindered. In some embodiments, a discharge valve 160 may be located next to the sink trap 150 for collecting sink water in the event of a frozen discharge system. The collected water may be disposed of manually to avoid potential backflow and/or clogging of the system.

To handle and dispose of waste, the system 100 includes a standalone urinal 170 for handling liquid waste, and also a toilet 180 for handling liquid and solid waste. Preferably, the urinal 170 is a waterless urinal designed to avoid the need to use water in handling liquid waste. In other embodiments, it can be a water-dependent urinal that preferably requires small amounts of water to function. In other embodiments, such as where space may be at a premium, the system 100 may eliminate the urinal 170 and include only the toilet 180 for handling all waste. In some embodiments, the urinal 170 may be piped or otherwise routed to an outdoor infiltration system or seepage pit 300 (see FIG. 6). In other embodiments, the urinal 170 may instead be connected to a container (not shown) via a hose or other piping, where the container can be disposed of manually as needed.

The toilet 180 is preferably designed to separate solid waste and liquid waste for subsequent disposal. To handle odors generated by the solid waste, the system 100 may include a ventilation system 190 that incorporates an energy efficient fan for constantly ventilating the toilet 180 to dry the solid waste and minimize odors within the home. In some embodiments, the ventilation system 190 may include an adjustable damper to allow ventilation of the house or structure to improve indoor air quality while minimizing energy loss. The liquid waste may be piped or otherwise routed to an outdoor infiltration system or seepage pit 300 (see FIG. 6), or to a separate container 214 (see FIG. 2) that can be disposed of manually. With particular reference to FIGS. 2-5, the following section provides additional details of various embodiments and features of the separating toilet 180.

FIGS. 2 and 3 illustrate one example embodiment of a separating toilet 180. With reference to FIG. 2, the separating toilet 180 includes a base 200 supporting a toilet seat 202 and a toilet seat cover 204. The base 200 and seat 202 are designed to support the user during use of the toilet 180. The seat 202 and cover 204 are attached to the base 200 via a hinge (not shown) to support upward and downward movement of the seat 202 and cover 204 as in a conventional toilet. The base 200 further includes a waste intake system 206 designed to separate liquid and solid waste. As illustrated in FIG. 2, the intake system 206 includes a separating wall 208 arranged to compartmentalize the intake system 206, the separating wall 208 diverting liquid waste (e.g., urine) toward the front portion of the intake system 206, and solid waste (e.g., fecal matter) toward the rear portion of the intake system 206.

As illustrated in FIGS. 2 and 3 collectively, the front portion of the intake system 206 includes a trough 210 for collecting liquid waste and a drain 212 for directing liquid waste collected in the trough 210 for disposal. In some embodiments, the drain 212 may be in communication with a separate container 214 via a tube 216 for directing liquid waste from the separating toilet 180 to the container 214 for manual disposal. In such embodiments, gravity causes the liquid waste to funnel through the drain 212 and into the container 214. In other embodiments, the tube 216 may direct liquid waste to an exterior infiltration system for disposal.

At the rear portion of the intake system 206, and behind the separating wall 208, is an opening or channel 218 positioned and designed to accept solid waste. The solid waste is collected in a container 220 positioned underneath the intake system 206. The container 220 is in communication with the ventilation system 190 (see FIG. 1) operable for drying the solid waste and controlling odors as mentioned previously. In other embodiments, the container 220 may incorporate fans, filters, and/or odor eliminating devices (not shown) instead of, or in addition to, the ventilation system 190 for more effective drying of solid waste and odor control. As illustrated in the figures, the container 220 is removable from the toilet 180 such that the solid waste can be disposed of in any suitable fashion.

FIGS. 4-5 illustrate another embodiment of a separating toilet 280 that may be used in conjunction with the sanitation system 100. The separating toilet 280 has some of the same features and characteristics as the toilet 180 described previously. Accordingly, certain features of the toilet 280 are not further discussed to avoid obscuring more pertinent features of the embodiment. Briefly, the toilet 280 includes a seat 282 and a seat cover 284 arranged in a similar fashion as described previously with respect to toilet 180. Underneath the seat cover 284, the toilet 280 includes a container 286 for receiving both liquid and solid waste. With reference to FIG. 5, the toilet 280 includes a toilet vent 288 adjacent the container 286. The toilet vent 288 is operable to help dry the solid waste and also to control odor of the waste in the container 286 during use. In some embodiments, the separating toilet 280 may be useful in environments where drainage of the sanitation system 100 freezes or fails due to other factors.

As noted previously, liquid waste from the separating toilets 180, 280 may be disposed of into a seepage pit 300 (if not otherwise disposed of manually). With particular reference to FIG. 6, the following provides additional details illustrating operation of the sanitation system 100 and seepage pit 300 in extreme climates. As illustrated in FIG. 6, the seepage pit 300 is designed specifically for cold climates where the seepage pit 300 may take advantage of typical freezing and thawing cycles of the soil. As illustrated in FIG. 6, during the summer and fall, wastewater (which may include both water and liquid urine waste) can move out of the seepage pit laterally through the thawed soils above the permafrost layer 302. Since the ground 304 is mostly thawed during these seasons, the wastewater essentially moves freely without much issue. As the season transitions to winter, a portion of the surface soil 306 freezes partially or entirely, thereby restricting the release of wastewater from the seepage pit 300 to the thawed soil 304 positioned between the permafrost layer 302 and the seasonal frost layer 306.

As winter continues, the seasonal frost layer 306 continues freezing the soil until the seasonal frost layer 306 reaches the permafrost layer 302. At this point, the soil 304 is fully frozen and drainage via the seepage pit 300 is no longer viable. During the winter therefore, the sanitation system 100 may be switched to a containerized operation, where water from the sink 140 and liquid waste from the urinal 170 and toilet 180 are diverted into one or more containers (not shown) and disposed of manually at a suitable location. In some embodiments, the one or more containers may include a valve or other flow restriction device that allows for the water to be easily diverted into the containers when the seepage pit 300 is not viable for the season. As the season transitions to spring, the seasonal frost layer 306 begins thawing from the surface level down toward the permafrost layer 302. As the soil thaws, wastewater can again move laterally through the seepage pit 300 into the surrounding soil. At that point, the valve or restriction device may be reset to allow water from the sink 140, urinal 170, and toilet 180 to resume flow into the seepage pit 300. Accordingly, the sanitation system 100 can begin to dispose of wastewater through the seepage pit again.

As described, the sanitation system 100 is designed to provide an improved system with most of the functionality of a conventional bathroom with plumbing, while also being designed in a modular configuration with components that can be easily assembled and disassembled to facilitate moving the entire sanitation system 100 (with the exception of seepage pit 300) to a new location to handle erosion issues. In addition, the modular design also helps simplify repairs to specific components as needed.

It should be understood that many of the features, components, and processes described in the embodiments of FIGS. 1-6 are for illustration purposes. Accordingly, one having ordinary skill in the art may rearrange the features and process steps described herein in any of the embodiments without departing from the principles of the disclosure. In addition, it is intended that subject matter disclosed in portion herein can be combined with the subject matter of one or more of other portions herein as long as such combinations are not mutually exclusive or inoperable. In addition, many variations, enhancements and modifications of the concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A portable sanitation and waste collection system, comprising:
   a water storage tank including a reservoir capable of storing water;
   a sink in operable communication with the water storage tank, the sink receiving water from the water storage tank, the sink in further communication with a seepage pit;
   a discharge valve operable for diverting water from the sink away from the seepage pit when the discharge valve is activated;
   a container in operable communication with the discharge valve and sink, the container receiving water from the sink when the discharge valve is activated;
   a toilet configured for receiving liquid waste and solid waste, the toilet including a waste intake module having a separating wall configured to divert the liquid waste into a liquid waste receptacle and the solid waste into a solid waste receptacle, the liquid waste receptacle further including a drain for receiving and funneling liquid waste; and a ventilation system in operable communication with the solid waste receptacle, the ventilation system operable to dry solid waste collected in the solid waste receptacle.

2. The system of claim 1, further comprising a water catchment system operable for collecting and storing water, wherein the water catchment system is in operable communication with the water storage tank and configured for delivering collected water to the water storage tank.

3. The system of claim 1, wherein the water storage tank is positioned at a height above the sink, the water storage tank delivering water to the sink via a gravity flow and without the aid of electrical power.

4. The system of claim 1, further comprising a liquid waste container in communication with the drain of the liquid waste receptacle, the liquid waste container operable to collect and store liquid waste passing through the drain.

5. The system of claim 1, further comprising a water treatment system in operable communication with the water storage tank, the water treatment system operable to purify water in the water storage tank to ensure the water is safe for human consumption, the sanitation system further include a second water storage tank in communication with the water treatment system for collecting and storing the purified water.

6. The system of claim 1, wherein the toilet is in operable communication with the seepage pit, the system further comprising one or more flow diversion devices operable to divert water from the sink and toilet away from the seepage pit.

7. The system of claim 6, wherein water flow from the sink is diverted into a first container and liquid waste from the toilet is diverted into a second container when the one or more flow diversion devices are activated, the first and second containers being removable for manual disposal.

8. The system of claim 1, the toilet further including a base housing the waste intake module and solid waste receptacle, the system further including a toilet vent supported within the base of the toilet, the toilet vent operable to dry solid waste collected in the solid waste receptacle.

9. A portable sanitation and waste collection system, comprising:
a water storage tank including a reservoir capable of storing water;
a sink in operable communication with the water storage tank, the sink receiving water from the water storage tank;
a water treatment system in operable communication with the water storage tank, the water treatment system operable to purify water in the water storage tank to ensure the water is safe for human consumption, the sanitation system further include a second water storage tank in communication with the water treatment system for collecting and storing the purified water;
a toilet configured for receiving liquid waste and solid waste, the toilet including a waste intake module configured to divert the liquid waste into a liquid waste receptacle and the solid waste into a solid waste receptacle;
an enclosure housing the water storage tank, the sink, and the toilet; and
a ventilation system in operable communication with the solid waste receptacle, the ventilation system operable to dry solid waste collected in the solid waste receptacle, the ventilation system further including an outlet on an exterior portion of the enclosure for ventilating the toilet to improve odor control.

10. The system of claim 9, wherein the liquid waste receptacle further includes a drain for receiving and funneling liquid waste to a liquid waste container.

11. The system of claim 9, wherein the water storage tank is positioned at a height above the sink, the water storage tank delivering water to the sink via a gravity flow and without the aid of electrical power.

12. The system of claim 9, further comprising a water catchment system operable for collecting and storing water, wherein the water catchment system is in operable communication with the water storage tank and configured for delivering collected water to the water storage tank.

13. The system of claim 9, further comprising a seepage pit in operable communication with the toilet and the sink, the seepage pit operable to receive water from the sink and liquid waste from the toilet.

14. The system of claim 13, further comprising one or more flow diversion devices operable to divert water from the sink and liquid waste from the toilet away from the seepage.

15. The system of claim 14, wherein water flow from the sink is diverted into a first container and liquid waste from the toilet is diverted into a second container, the first and second containers being removable for manual disposal.

16. A portable sanitation and waste collection system, comprising:
a water storage tank including a reservoir capable of storing water;
a sink in operable communication with the water storage tank, the sink receiving water from the water storage tank, the sink in further communication with a seepage pit;
a toilet configured for receiving liquid waste and solid waste, the toilet including a waste intake module configured to divert liquid waste into a liquid waste receptacle and solid waste into a solid waste receptacle, the toilet in further communication with the seepage pit, wherein the seepage pit is configured to receive water from the sink and liquid waste from the toilet;
an enclosure housing the water storage tank, the sink, and the toilet;
one or more flow diversion devices operable to divert water from the sink and the liquid waste from the toilet away from the seepage pit, wherein water flow from the sink is diverted into a first container and liquid waste from the toilet is diverted into a second container, the first and second containers being removable for manual disposal; and
a ventilation system in operable communication with the solid waste receptacle, the ventilation system operable to dry solid waste collected in the solid waste receptacle, the ventilation system further including an outlet on an exterior portion of the enclosure for ventilating the toilet to improve odor control.

17. The system of claim 16, further comprising a water catchment system operable for collecting and storing water, and wherein the water catchment system is in operable communication with the water storage tank and configured for delivering collected water to the water storage tank.

18. The system of claim 16, a water treatment system in operable communication with the water storage tank, the water treatment system operable to purify water in the water storage tank to ensure the water is safe for human consumption, the sanitation system further include a second water storage tank in communication with the water treatment system for collecting and storing the purified water.

19. The system of claim 16, wherein the water storage tank is positioned at a height above the sink, the water storage tank delivering water to the sink via a gravity flow and without the aid of electrical power.

\* \* \* \* \*